United States Patent [19]
Kendall

[11] Patent Number: 5,355,888
[45] Date of Patent: Oct. 18, 1994

[54] HIGH RESOLUTION PHASED ARRAY ECHO IMAGER

[75] Inventor: Henry W. Kendall, Sharon, Mass.

[73] Assignee: Massachusetts Institute of Technology, Cambridge, Mass.

[21] Appl. No.: 975,509

[22] Filed: Nov. 12, 1992

[51] Int. Cl.$^5$ ............................................. A61B 8/00
[52] U.S. Cl. ............................................. 128/660.07
[58] Field of Search .................. 128/660.04, 660.07, 128/661.01; 73/625–626

[56] References Cited

U.S. PATENT DOCUMENTS

| | | | |
|---|---|---|---|
| 4,252,026 | 2/1981 | Robinson | 73/626 |
| 4,254,662 | 3/1981 | Kuroda et al. | 73/626 |
| 4,319,489 | 3/1982 | Yamaguchi et al. | 73/626 |
| 4,553,437 | 11/1985 | Luthra et al. | 73/626 X |
| 4,566,459 | 1/1986 | Umemura et al. | 73/626 X |
| 4,694,434 | 9/1987 | von Ramm et al. | 73/626 X |

*Primary Examiner*—Francis Jaworski
*Attorney, Agent, or Firm*—Testa, Hurwitz & Thibeault

[57] ABSTRACT

An ultrasound imaging system, and method for using the same, includes an active transducer and transmitter for producing a pulse of ultrasonic energy steerable in the direction of one or more targets. The active transducer is also coupled to a receiver for receiving an echo of the pulse returned from each target. A second, passive phased-array transducer acts as another receiver and is electronically steerable to receive echoes of the pulse returned from each target. A controller coordinates steering of the active and passive transducer "listening" directions toward each target, and a signal processor processes the echoes received by the receivers from each target to form a composite image of the target. A second passive transducer can be added to further enhance the imaging resolution. In preferred embodiments, the active and passive transducers are electronically steered phased array transducers.

27 Claims, 6 Drawing Sheets

HIGH RESOLUTION PHASED ARRAY ECHO IMAGER

BACKGROUND OF THE INVENTION

This invention relates to echo imaging systems generally, and medical ultrasound imaging systems for imaging sections of a body to visualize internal structures, and more particularly to a phased array ultrasound imaging system having improved spatial resolution.

In recent years considerable progress has been made in the utilization of ultrasonic techniques for the exploration of the internal structure of living organisms. This technique has been used to visualize, measure, and record images of deep lying organs and physiological structures throughout the body.

The majority of diagnostic techniques using ultrasound are based on the pulse-echo method wherein short pulses of ultrasonic acoustic energy are periodically generated by a suitable piezoelectric transducer, or probe. Each short pulse of ultrasonic energy is focused into a narrow beam which is transmitted along a selected direction into the patient's body. The transmitted pulse eventually encounters interfaces between the various different structures as it propagates along its directional path within the body. When there is a characteristic acoustic impedance mismatch at an interface, a portion of the ultrasonic energy is reflected from the interface back toward the transducer. After generation of the transmit pulse, the transducer operates in a "listening" mode wherein it receives reflected energy or echoes from the body and converts them into electrical signals. The time of arrival of these echoes after the transmit pulse depends on the ranges of the interfaces encountered and the propagation velocity of the ultrasound. Also, the amplitude of the echo is indicative of the reflection properties of the interface and, accordingly, of the nature of the characteristic structures forming the interface. The information contained in the returning echoes are typically collected for a plurality of scanning directions to form an image which is displayed on a CRT as a cross-sectional image of the structures visualized.

Phased array transducers having multiple piezoelectric elements are commonly used to electronically select the direction of a transmitted pulse along scan lines forming a sector. These transducers are also electronically steered to listen for returning echoes along a particular direction, typically along the same scan line as the most recently fired transmit pulse.

SUMMARY OF THE INVENTION

The present invention provides an echo ranging system, such as a medical ultrasound imager, with significantly improved spatial resolution. The invention achieves substantial gain in the angular resolution characteristics compared to a single phased-array transducer echo imager. The invention also achieves substantial gain in the detection of Doppler velocity signals.

In one aspect of the invention, an ultrasound imaging system, and method for using the same, includes an active transducer and transmitter for producing a pulse of ultrasonic energy steerable in the direction of one or more targets. The active transducer is also coupled to a receiver for receiving an echo of the pulse returned from each target. A second, passive phased-array transducer acts as another receiver and is electronically steerable to receive echoes of the pulse returned from each target. A controller coordinates steering of the active and passive transducer "listening" directions toward each target, and a signal processor processes the echoes received by the receivers from each target to form a composite image of the target.

In preferred embodiments, the passive transducer is an electronically steered phased array transducer. The active transducer is also an electronically steerable phased array transducer.

In other preferred embodiments, the controller steers the active transducer to produce a pulse of ultrasonic energy which propagates along a first direction. The controller also electronically steers the passive transducer to receive echoes of the ultrasonic pulse returned from a target along a second direction which intersects the first direction at the target. The second direction is periodically updated by the controller to track echoes of the ultrasonic pulse returned by other targets as the ultrasonic pulse propagates along the first direction.

In still other preferred embodiments, the active transducer is rigidly fixed relative to the passive transducer. The active transducer is steerable over a set of first directions defining an active area, and the passive transducer is steerable over a set of second directions defining a passive receive area. The active area and the passive area overlap. Preferably, the active transducer is a phased array transducer and the active region is a portion of a cone with the active transducer at its apex. The passive transducer is also a phased array transducer and the passive receive region is a portion of a cone with the passive transducer at its apex.

In yet other preferred embodiments, the second direction intersects the first direction at the target with an angle of between 30° and 150°, preferably with an angle between 60° and 120°. In other preferred embodiments, the targets are structures in a human body and the ultrasound pulse has a carrier frequency between 2.0 and 10 MHz.

In still other preferred embodiments, another, second passive phased-array transducer adds a third receiver and is also electronically steerable to receive echoes of the pulse returned from each target. The first passive transducer, and the second passive transducer are located outside the imaging plane of the active transducer to enhance the angular resolutions of the active transducer.

Thus, the invention described herein offers the advantages of providing a high resolution echo imager having improved angular resolution characteristics similar to that of range resolution. The improved spatial resolution of this device allows echo imaging to be applied in ways not practicable before, such as cardiac angiography or high resolution ultrasonic microscopy.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENT

Figure 1:
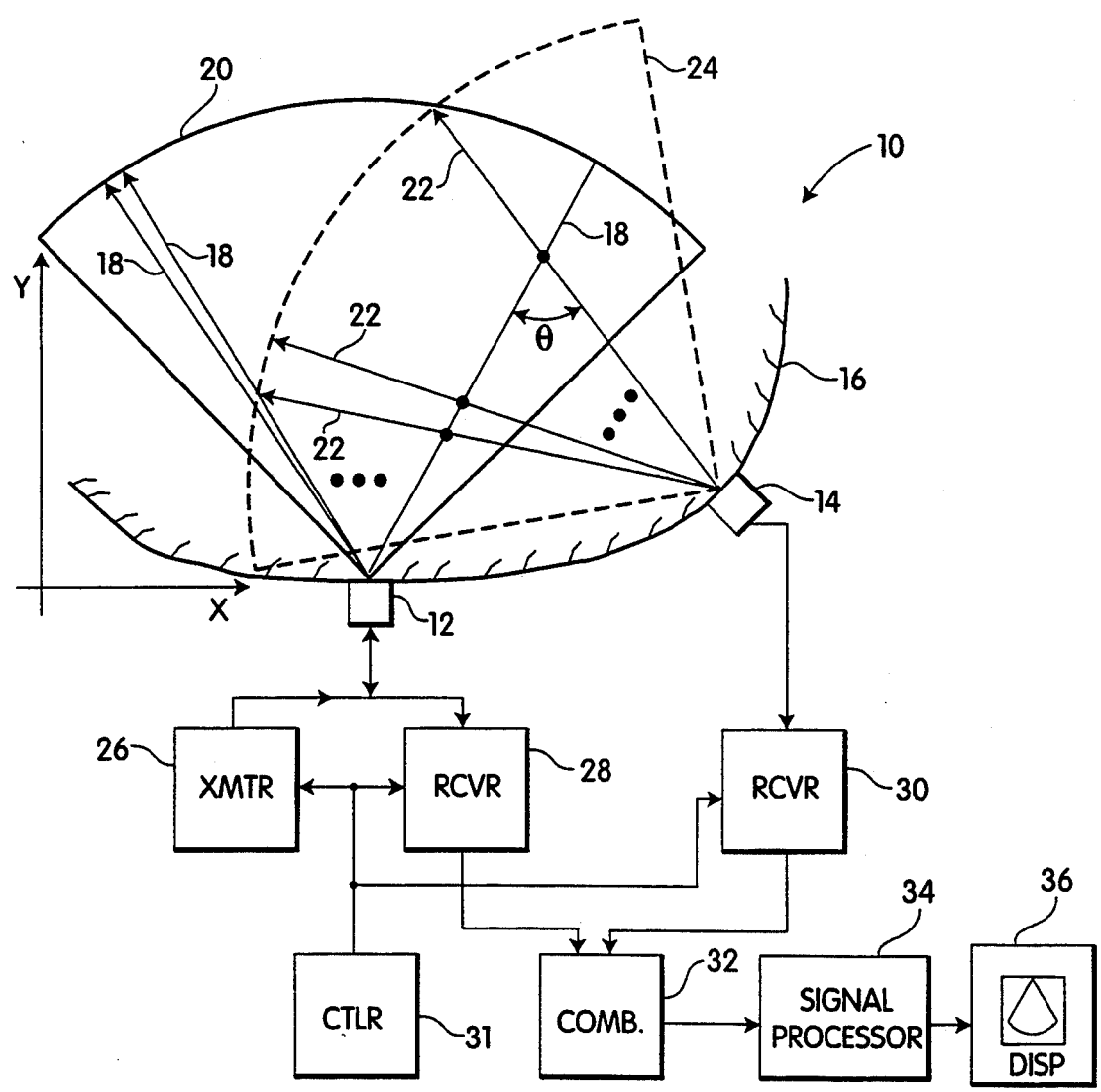
FIG. 1 shows a schematic block diagram of a preferred embodiment of the high resolution echo imager of this invention featuring an active and a passive electronically steerable transducer.

Referring to FIG. 1, a medical phased array ultrasound imaging system 10 having improved spatial resolution features an active phased array transducer 12 and a passive phased array transducer 14 which are operated simultaneously to image structures inside a body 16. Active phased array transducer 12 is multiple element piezoelectric transducer which is operated in a mode commonly referred to as a phased array sector scan. That is, transducer 12 is maintained at a fixed position and the beam from transducer 12 is electronically steered to transmit an ultrasound pulse along a directional scan line 18, and to receive echoes returned along the same scan line to produce an image of structures lying along the line. The transducer's beam is steered to produce a plurality of scan lines 18 lying in the same XY-plane, each taken at a slightly different direction relative to transducer 12 to image an active sector 20 cross-section of body 16.

Passive phased array transducer 14 is another multiple element piezoelectric transducer maintained at a fixed position preferably in the XY-plane and whose listening direction, or listening beam is electronically steerable to passively receive ultrasound echoes returned along a receive, or listening, direction 22. The listening direction of passive transducer 14 can be steered to receive echoes along any of the listening directions 22 included in a passive sector 24. Active transducer 12 is positioned relative to passive transducer 14 so that the actively scanned sector 20 and the passively scanned sector 24 substantially overlap each other. Preferably, passive transducer 14 is spatially fixed relative to active transducer 12 by, for instance, mounting the two transducers on a common rigid structure (not shown).

The listening direction of passive transducer 14 is electronically steered to receive ultrasound echoes generated by the pulses transmitted by active transducer 12 during the process of scanning active sector 20. After a pulse is transmitted by transducer 12 along a specific scan line 18, the listening direction of passive transducer 14 is steered to track the echoes generated by the propagating pulse and thereby receive echoes from structures along direction 18, i.e., at the intersection of directions 18 and 22. It should be noted that active transducer 12 maintains a fixed transmit and listen direction while a pulse is transmitted along a specific scan line 18, while passive transducer 14 scans its listening direction during its listen phase to track the desired echoes. Due to propagation delays associated with the transmission of sound echoes through the medium being scanned, the scanned listening direction of transducer 14 lags behind the present position of the pulse propagating along scan line direction 18. In this manner, the two transducers will receive echoes from any points located within the overlap of active sector 20 and passive sector 24.

Listening direction 22 intersects scan line direction 18 with an angle Θ. Angle Θ varies as a pulse propagates along scan line 18 away from transducer 12 into the body, and listening direction 22 is electronically steered by passive transducer 14 to track behind a propagating pulse along scan line 18 into the body and thus receive echoes generated by internal structures along receive direction 22. The echoes received by active transducer 12 and passive transducer 14 are combined to form a high resolution image of structures within the area of overlap of active sector 20 and passive sector 24.

Active transducer 12 is excited by an ultrasound transmitter 26 which electronically steers the beam of the phased array transducer to transmit, or fire, a short pulse of ultrasound energy into the body along a scan line 18 of sector 20. After a pulse is fired by transmitter 26 and transducer 12 along a particular scan line direction, a receiver 28 maintains the listening direction of phased array transducer 12 positioned to passively listen for returning echoes along the transmit direction and thereby build an image of the structures along that direction. A scan controller 31 controls the sequence of transmit and receive cycles which is repeated for each scan line 18 of sector 20.

A second phased array receiver 30 steers the listening direction of passive phased array transducer 14 to listen along a plurality of receive directions 22 which intersect an active scan line 18 at a position behind a propagating transmit pulse generated by transducer 12, determined by the propagation delay from the intersection to passive transducer 14. Receiver 30 electronically steers the listening direction of transducer 14 to receive echoes at the expected direction of echoes returned for structures along the particular active direction 18. In this manner passive receiver 30 receives echoes generated by each transmit pulse as it propagates along a direction 18 of active sector 20 which overlaps passive sector 24.

Controller 31 coordinates the steering of active transmitter 26, active receiver 28 and passive receiver 30. The outputs of receiver 28 and receiver 30 are combined into a single high resolution image of the points along each scan line direction 18 by a combiner circuit 32. Combiner circuit 32 takes into account the angle $\theta$ at which directions 18 and 22 intersect, as well as differences in propagation time delays encountered by echoes from a common point returning along the different length paths to each of transducers 12, and 14. Combiner circuit 32 also accounts for amplitude differences in the echoes returning to the different transducers. For instance, since the path lengths can be substantially different, time/gain amplitude compensation can be independently applied to each receiver circuit to compensate for propagation path amplitude losses including spreading of the primary transmit pulse and its echoes. Other amplitude variations can be compensated for, such as the differences in the echo strength propagated directly back along a scan line 18 and the echo strength propagated at angle $\theta$ along receive direction 22. These variations depend on the scattering characteristics of the structures being imaged as well as angle $\theta$. The output of combiner 32 is accumulated by signal processor 34 which converts the scan line data into a digital representation for display on a cathode ray tube display 36 (CRT).

Figure 2:
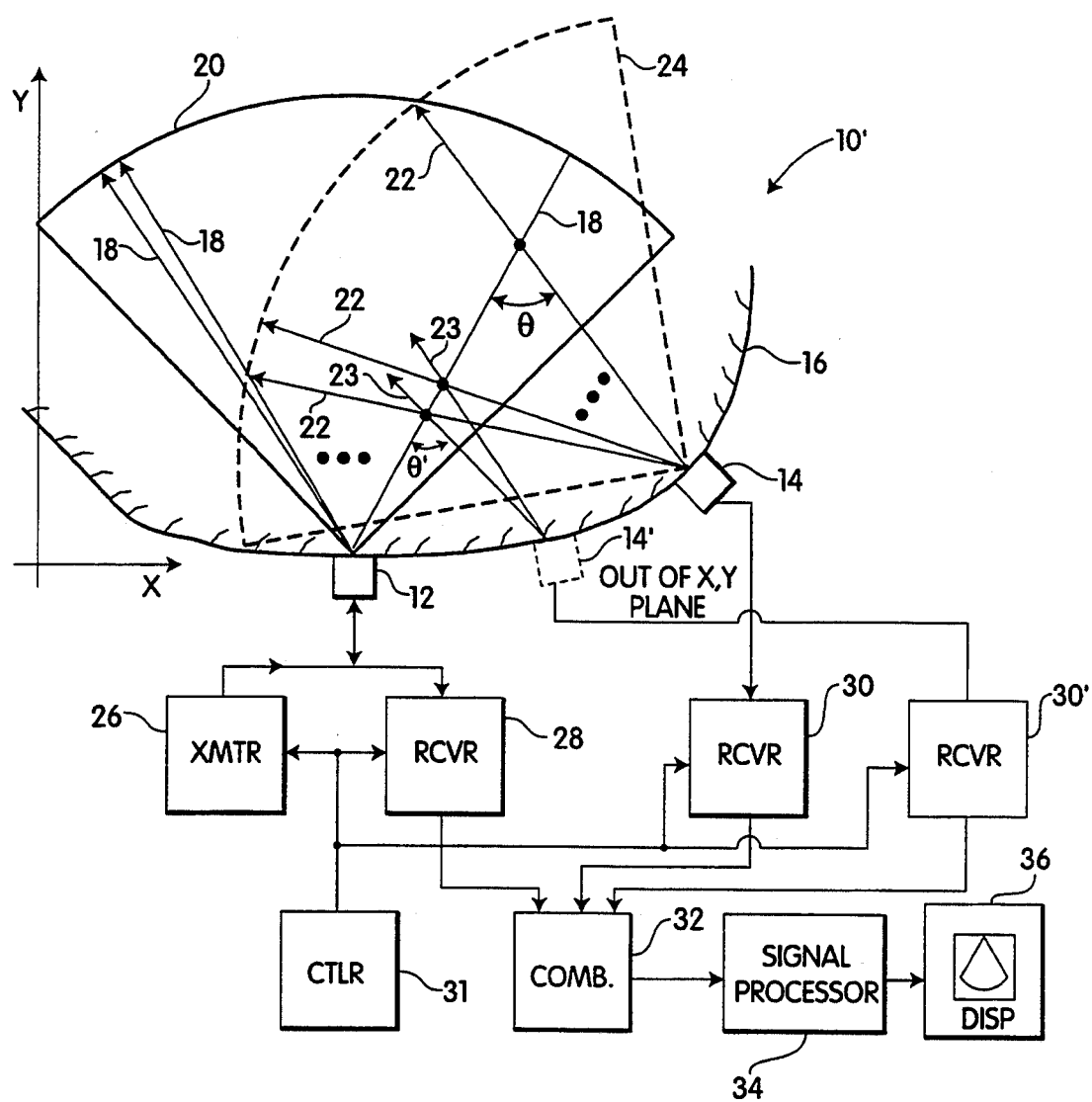
FIG. 2 shows a schematic block diagram of a preferred embodiment of the high resolution echo imager of FIG. 1 with the addition of a second passive transducer.

Referring to FIG. 2, a medical phased array ultrasound imaging system 10' having improved spatial resolution in three-dimensions features the system 10 of FIG. 1 with the addition of a third phased array receiver 30' for steering the listening direction 23 of another passive transducer 14' located outside the XY-plane formed by transducer 12, transducer 14, and the intersection points of directions 18 and 22.

Figure 3:
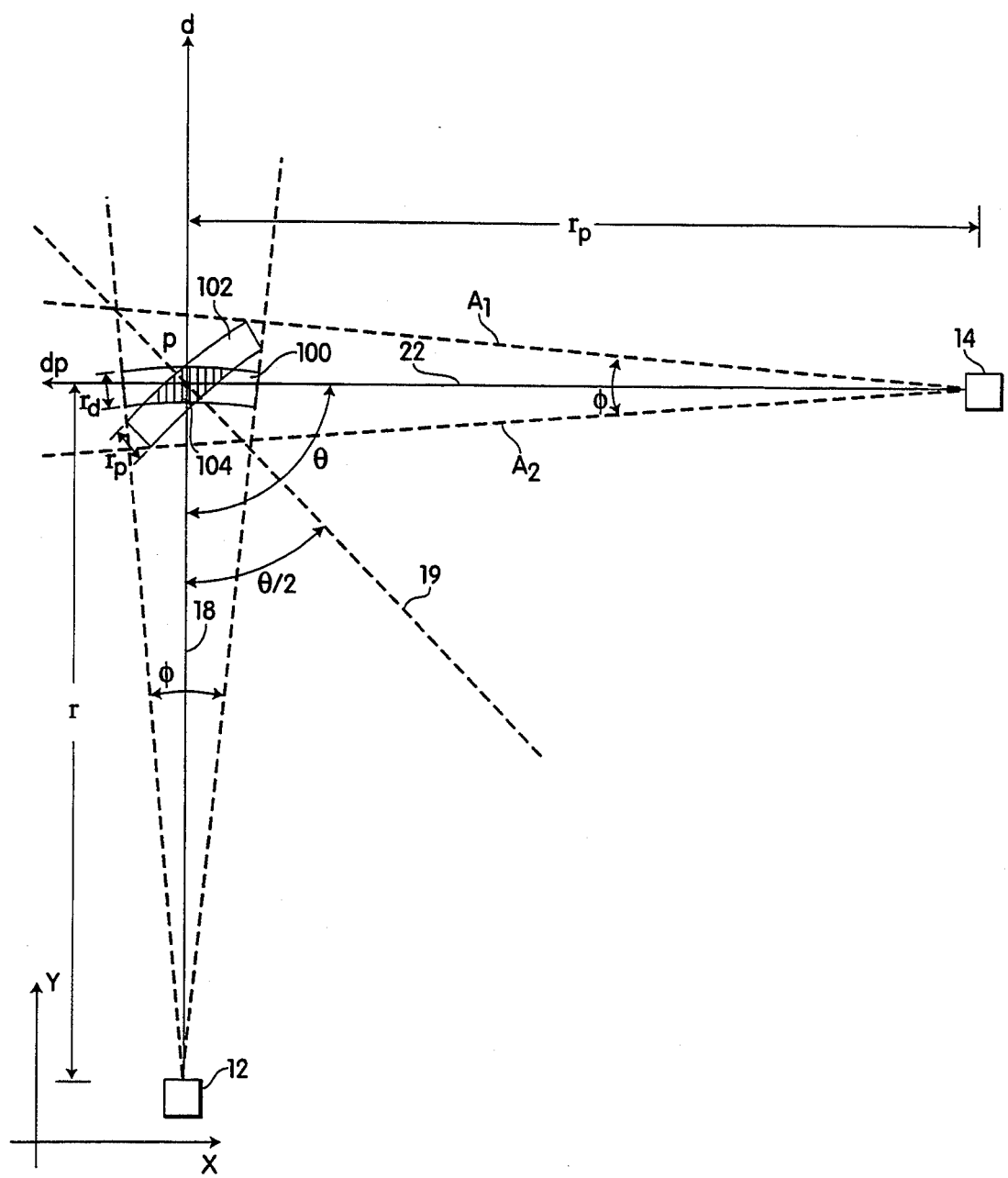
FIG. 3 is a diagram illustrating the spatial resolution gain achieved by the combined affect of the active and passive transducers of the high resolution echo imager of FIG. 1.

FIG. 3 shows how the combination of an active transducer 12 and a passive receiving transducer 14 combines to effect dramatically improved spatial imaging resolution. Active transducer 12 emits an ultrasound pulse which propagates along a scan line 18 direction d and returns echoes to transducer 12 from structures encountered along its propagation path. Because the transmit pulse length is small in relationship to the structures being imaged, and the time of a returning echo can be precisely measured from the time of the transmit pulse, the range resolution $r_d$ of returning echoes along direction d toward transducer 12 are typically excellent. For example, for a typical 3.5 MHz phased array ultrasound imaging system, the range resolution along any particular imaging direction can be on the order of or less than a millimeter. That is, echoes from structures separated by no more than a millimeter along the direction d can be resolved. The angular resolution of structures located along direction d is more difficult to control since it depends on many different factors including the dimensions and aperture of the phased array transducer 12, beam forming characteristics, angle of direction d relative to the face of the transducer, wavelength of the ultrasonic signal, or other factors. Angular resolution is shown as angle $\phi$ and may typically be on the order of one half degree or more. (dimensions and angles of FIG. 2 are shown exaggerated for clarity). The spatial resolution of a point P being imaged is greater as the distance r from transducer 12 to point P increases since the spatial resolution $s = r \times \phi$, where $\phi$ is the angular resolution.

The total affect of range resolution $r_d$ and angular resolution $\phi$ for imaging a particular point P along direction d can be visualized as an arc segment 100 having a length $s = r \times \phi$ and a thickness $r_d$. Thus, for a transmit pulse propagating from transducer 12 along direction d, any structure located within region 100 can return an echo to transducer 12 which will appear to have been generated from a point source at P.

The addition of passive transducer 14 for receiving echoes along another listening direction $d_p$ which also intersects point P can dramatically increase the apparent spatial resolution of point P for transducer 12 to that approaching the range resolution. The resolution characteristics of passive transducer 14 for receiving echos of pulses generated by transducer 12 are shown as a segment 102 oriented perpendicular to the bisector direction 19 which bisects the angle $\theta$ between directions 18 and 22. Passive receive direction $d_p$ intersects active scan line direction d at point P with an angle $\phi$. Segment 102 has a thickness $r_p$ related to the range resolution of transducer 14, the width of the transmitted pulse, and angle $\theta$, and is bounded by the dashed line, $A_1$ and $A_2$, defining the listening beam angular boundaries of transducer 14 having resolution $\phi$. The combined spatial resolution of transducer 12 and transducer 14 is described by the area of overlap 104 between the region 100 of active transducer 12 and the region 102 of passive transducer 14. That is, by combining the resolution characteristics of the two transducers in a manner which takes advantage of the superior range resolutions of each transducer, the spatial resolution of the combined transducer system is enhanced to be that area within overlap 104.

It is apparent from FIG. 3 that the shape and size of overlap area 104 changes significantly with intersection angle $\theta$, but in most cases can be approximated by a parallelogram. If transducer 12 and transducer 14 are located on top of each other, $\theta$ is zero and resolution cell 100 completely overlaps resolution cell 102 and no improvement is achieved. On the other hand, if transducer 12 and transducer 14 are located so that direction d and direction $d_p$ are perpendicular, i.e., $\theta = 90°$, then resolution cell 104 approximates a diamond shape parallelpiped as shown in FIG. 3. At $\theta = 180°$ the apparent angular resolution of transducer 12 is equivalent to the range resolution of transducer 14, which is the maximum resolution gain theoretically achievable by this technique. However, at $\theta = 180°$ the primary pulse transmitted by transducer 12 mingles with the reflected pulse so the spatial resolution of the imaging system is improved for any angle $\theta$ greater than 0°, with maximum improvement occurring as $\theta$ approaches 180°, but before the primary and reflected beams merge and can no longer be distinguished from each other.

In a system having one active and one passive transducer, the resolution improvement at a target occurs in the plane (XY-plane) defined by the active transducer, the passive transducer, and the target, which is called here the "enhanced resolution plane". The spatial resolution in a direction perpendicular to the "enhanced resolution plane" is not improved by the single passive transducer 14. However, the spatial resolution outside the enhanced resolution plane can be improved by the addition of a second passive transducer (e.g., transducer 14' of FIG. 2) positioned outside of the enhanced resolution plane. Thus, improved three-dimensional spatial resolution is possible by using one active and two passive transducers.

The addition of passive transducer 14' outside the plane for receiving echoes along listening direction dp', which also intersects point P, can dramatically increase the apparent three dimensional spatial resolution of transducer 12 at point P to that approaching the range resolution of the transducer. The angular and range resolution characteristics of transducer 14 are shown in FIG. 3.

Figure 4:
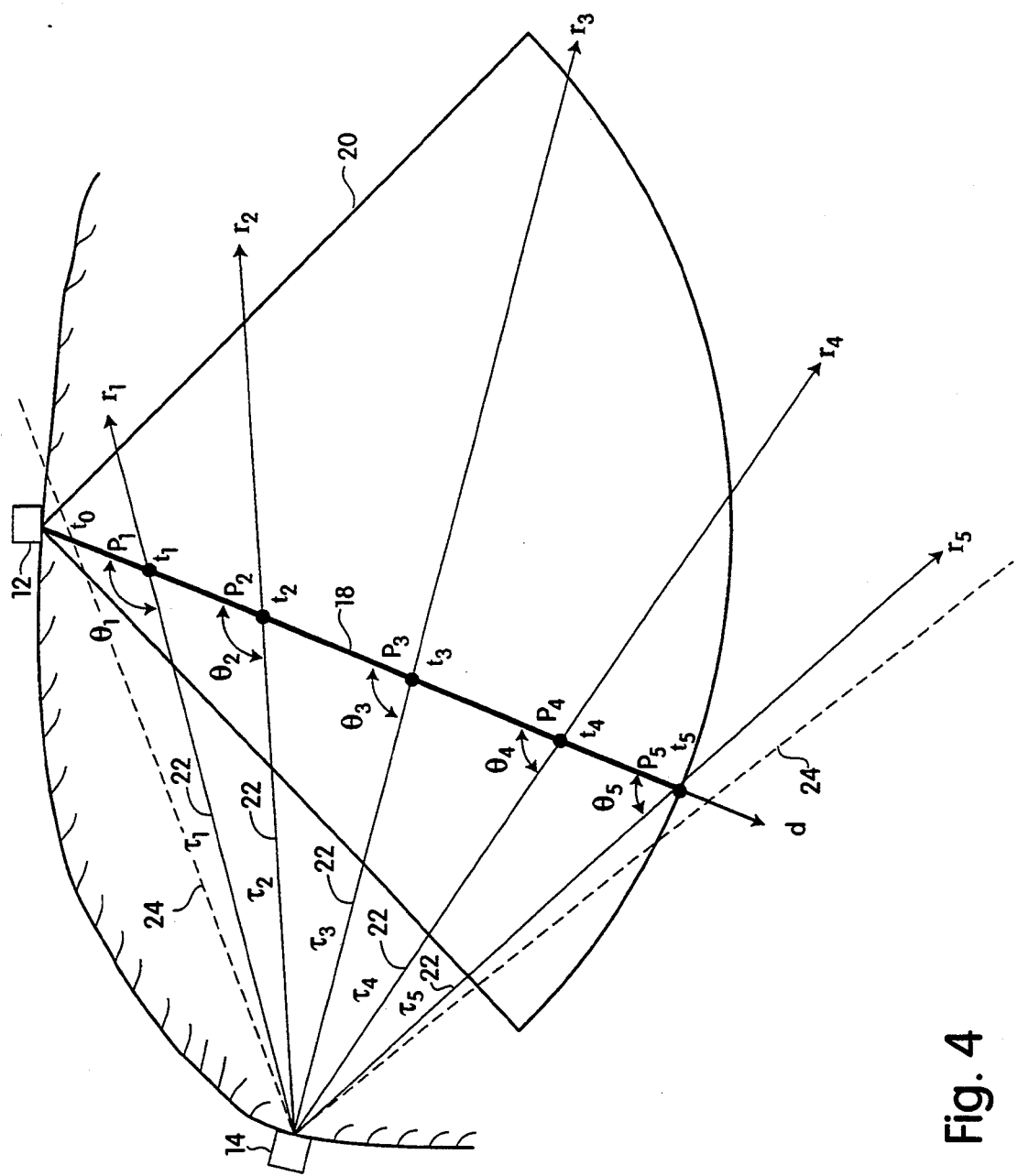
FIG. 4 is a diagram illustrating the passive transducer tracking echoes from a transmit pulse to provide enhanced spatial resolution for the high resolution echo imager of FIG. 1.

FIG. 4 shows the scan sequence for a typical scan line 18 taken along direction d of image sector 20 and overlapped by receiver sector 24 of passive transducer 14. Active phased array transducer 12 emits a pulse of ultrasound energy steered in direction d at time $t_0$. At time $t_1$ the output pulse has propagated along direction d to point $p_1$. At time $t_1 + Y_1$ the listening direction of passive phased array transducer 14 is steered to receive echoes along direction $r_1$ passing through point $p_1$ and forming an angle $\theta_1$ with direction d. $Y_1$ is the time required for an echo to propagate from point $p_1$ to transducer 14 along direction $r_1$. At time $t_2$ the output pulse has propagated along direction d to point $p_2$, and the listening direction of phased array transducer 14 is steered to receive echoes along direction $r_2$ from point $p_2$ at time $t_2+Y_2$, where $Y_2$ is the propagation time from $p_2$ to transducer 14. Direction $r_2$ forms an angle $\theta_2$ with direction d. Passive phased array transducer 14 continues to sweep its receiving direction to follow the returning echoes generated by the propagating pulse along direction d, i.e., to steer receive directions $r_3$, $r_4$, and $r_5$ at time $t_3+Y_3$, $t_4+Y_4$, and $t_5+Y_5$, respectively, to receive echoes from points $p_3$, $p_4$ and $p_5$. Although FIG. 4 illustrates the imaging of only five points along direction d, a typical imaging system will normally collect hundreds of points along a single scan line, in which case the listening direction of passive transducer 14 would be steered to each of those points in succession along direction d to track behind the propagating transmit pulse to receive an echo produced by each point.

Figure 5:
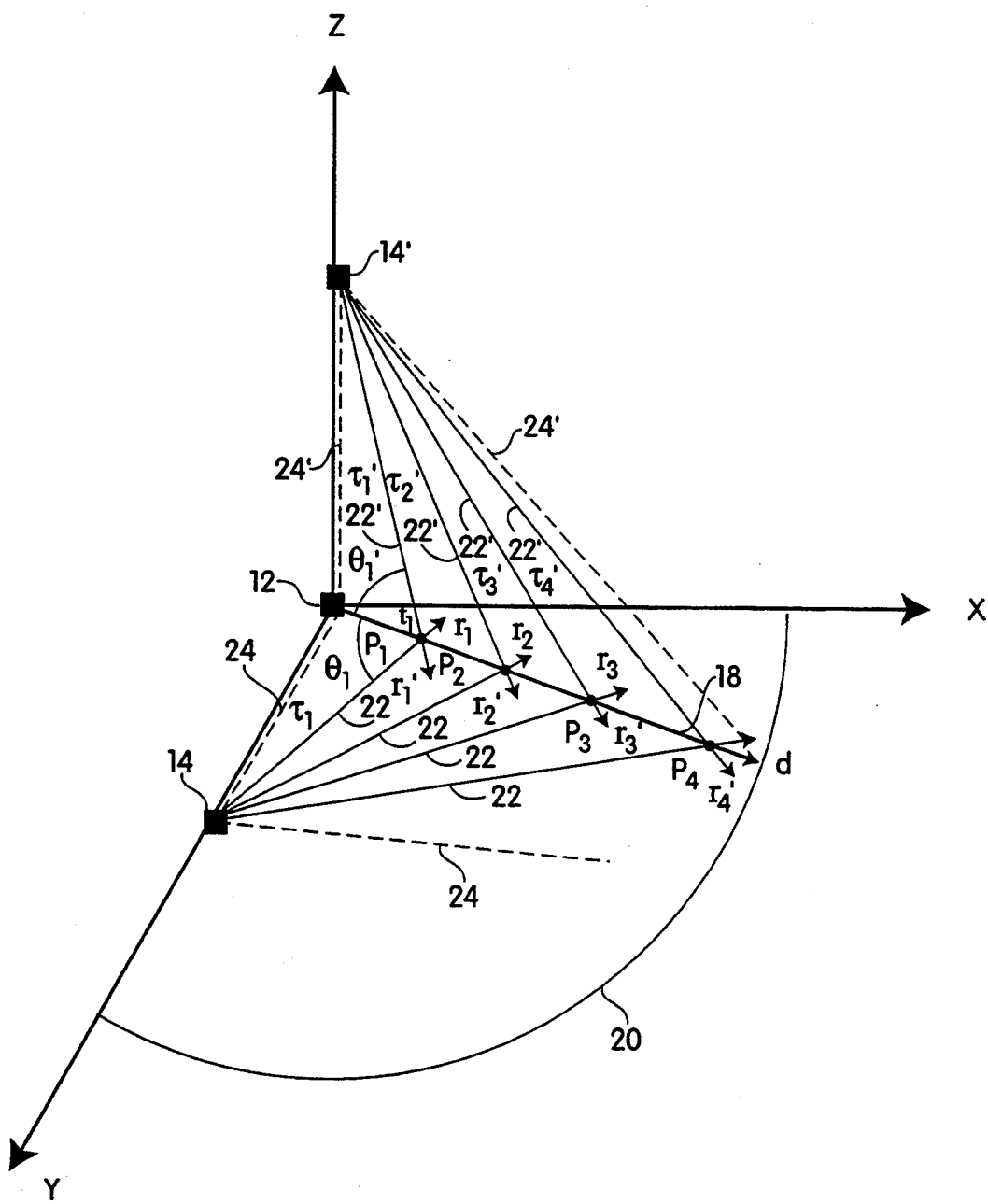
FIG. 5 is a diagram illustrating two passive transducers tracking echoes from a transmit pulse to provide enhanced spatial resolution for the high resolution echo imager of FIG. 2.

FIG. 5 shows the addition of a second passive phased array transducer 14' positioned outside the XY-plane, formed by the active transducer 12, the passive transducer 14, and the active imaging sector 20, for imaging a set of targets lying in the XY-plane. This configuration enhances the imaging characteristics of the system outside the XY-plane in addition to the enhanced angular resolution gained in the XY-plane. Passive transducer 14' enhances the resolution of active transducer 12 approaching that of the passive transducer's range resolution in the same manner as passive transducer 14 enhances the resolution of active transducer 12, as shown in FIG. 3.

In the scan sequence shown in FIG. 5, for a set of targets lying in the XY-plane, a typical scan line 18 of image section 20 taken along direction d in the XY-plane is overlapped by the planar receiver sector 24 of passive transducer 14 in the XY plane, and, by a planar receiver sector 24' of passive transducer 14' which intersects the XY-plane along direction d. Passive transducer 14 receives echoes from structures along direction d as described above with reference to FIG. 4. Passive transducer 14' also receives echoes from structures along direction d in a manner analogous to that of passive transducer 14. For instance, active phased array transducer 12 emits a pulse of ultrasound energy steered in direction d at time $t_0$. At time $t_1$ the output pulse has propagated along direction d to point $p_1$. At time $t_1+Y_1'$ the listening direction of passive phased array transducer 14' is steered to receive echoes along direction $r_1'$ passing through point $p_1$ and forming an angle $\theta_1'$ with direction d. $Y_1'$ is the time required for an echo is propagate from point $p_1$ to transducer 14' along direction $r_1'$. At time $t_2+Y_2'$ transducer 14' is steered to listen for echoes returning from point $P_2$ along direction $r_2'$. Transducer 14' continues to steer receive direction $r_3'$ and $r_4'$ at times $t_3+Y_3'$ and $t_4+Y_4'$, respectively, to receive echoes from points $p_3$ and $p_4$. It should be noted that to receive echoes from other scan directions in sector 20, receive sector 24' of passive transducer 14' needs to be aligned with the new scan direction to intersect the XY-plane along that direction. Thus, it is necessary that passive transducer 14' be electronically steerable in two directions. To scan a region in the X-Y-Z space containing randomly located targets, transducers 12, 14, and 14' all need to be steerable in two directions.

Figure 6:
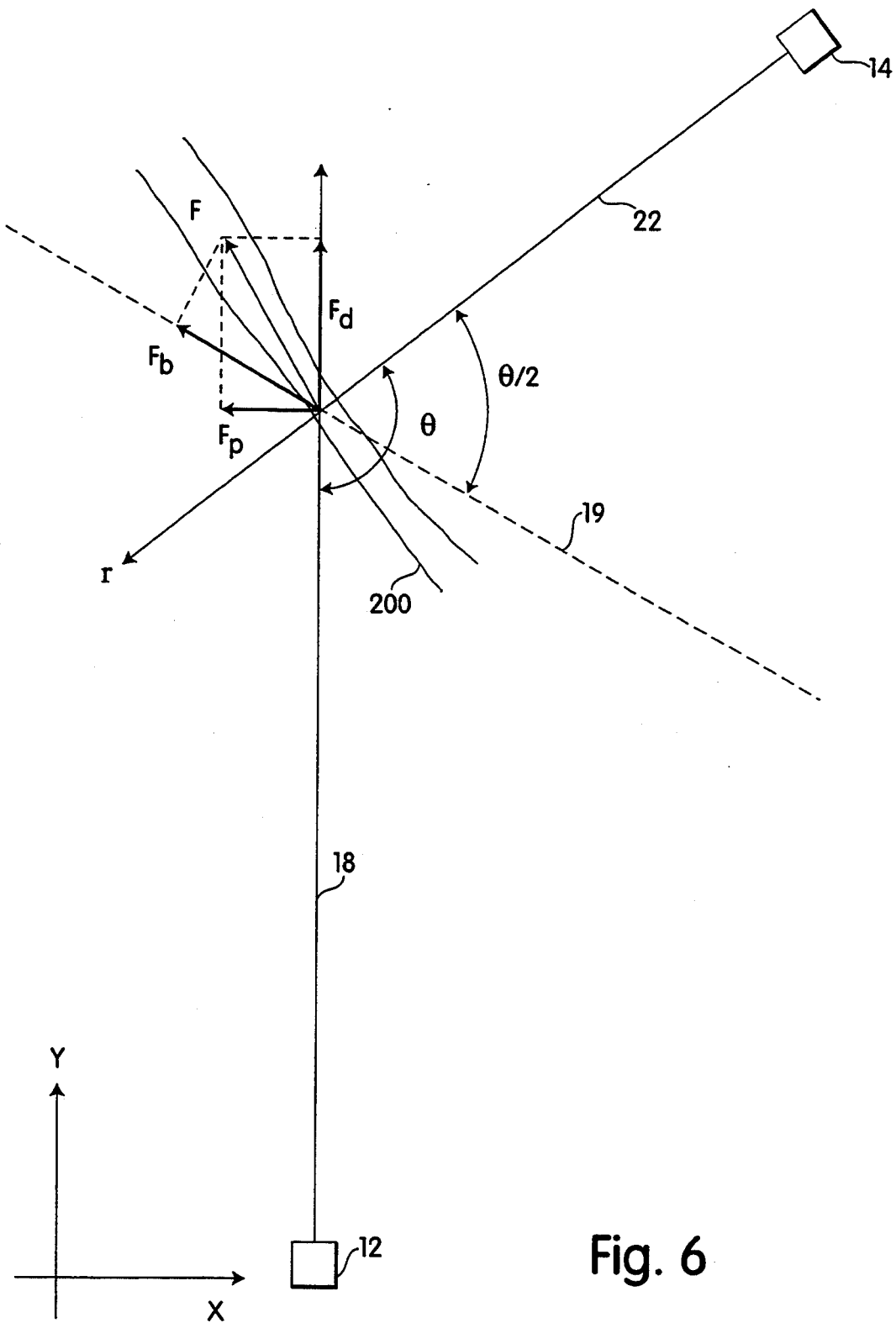
FIG. 6 is a diagram illustrating improved Doppler detection achieved with the high resolution echo imager of FIG. 1.

FIG. 6 shows how the high resolution ultrasound echo imager of this invention can be used also to improve Doppler signal detection, which is commonly used to quantify blood flow in vessels. In conventional Doppler systems, blood flow through a vessel 200 represented by velocity vector F is sampled at point P by ultrasound pulses transmitted along direction d from a single transducer 12. The velocity component of F along direction d, $F_d$, causes a detectable frequency shift in the ultrasound echo returning to transducer 12 along direction d, which is proportional to the magnitude of $F_d$. From this detected velocity information, and with knowledge of the direction of the velocity vector F gained from visualization of the vessel, an estimate of the magnitude of F can be deduced. In the conventional Doppler system, only the velocity component along direction d, $F_d$, provides a detectable frequency shift. The orthogonal component of F along direction p, $F_p$, which is perpendicular to $F_d$, is undetectable by transducer 12. Thus, neither the magnitude nor flow direction of F can be precisely established in conventional systems, except in the case where F and $F_d$ coincide.

A better estimation of the magnitude of the flow vector F can be achieved by using the additional passive transducer 14 of this invention to detect the Doppler frequency shift along passive receive direction r. Passive receive direction r intersects active scan line direction d at the Doppler sample point P with an angle $\theta$. The velocity component of F along direction b along line 19 will cause a detectable frequency shift in the echo returning to transducer 14. The component of velocity vector F that causes a Doppler frequency shift in the echo reflected toward transducer 14 along direction r is $F_b$, the velocity component of F located along bisector direction 19. The magnitude of flow velocity vector F is calculated from velocity components $F_d$, $F_b$, and angle $\theta$. It should also be noted that the addition of a second passive transducer 14' as shown in FIG. 5 will provide detection of Doppler velocity components lying outside the XY-plane, i.e., 3-dimensional Doppler.

The present invention is particularly useful for collecting Doppler information from many points along a scan line as in the case of Color Flow mapping systems. The agile tracking ability of passive transducer 14 allows high quality Doppler samples to be gathered from a large quantity of points along each active scan line.

While this invention has been particularly shown and described with references to preferred embodiments thereof, it will be understood by those skilled in the art that various changes in form and details may be made therein without departing from the spirit and scope of the invention as defined by the appended claims.

For instance, the preferred embodiments described herein disclose electronically steered phased array sector scanning transducers. Other types of electronically steered transducers such as linear arrays and combined linear/phased array transducers may also be used. The active and passive phased array transducers need not be separate devices. For example, two portions of a single, elongated phased array transducer can be configured as independent spatially separated active and passive transducers. Furthermore, the active transducer can be a mechanically steered transducer as long as the passive transducer is agile and electronically steered. More than two transducers may also be used to accomplish the same results. All transducers can be active transducers, as long as at least one can passively scan a propagating ultrasound pulse generated by the other transducer. It will also be apparent to those skilled in the art that apparatus and techniques analogous to those described herein can be applied to other related areas such as undersea sonic imaging and radar imaging.

I claim:

1. An ultrasound imaging system having improved spatial resolution, comprising:
   an active transducer coupled to an ultrasonic transmitter for producing a pulse of ultrasonic energy in a first direction along which one or more targets are disposed, the active transducer also is coupled to a first ultrasonic receiver for receiving a plurality of echoes of the pulse, each of the echoes corresponding to a different one of the targets and returning to the active transducer along the first direction;
   a first passive transducer coupled to a steerable second ultrasonic receiver for receiving the plurality of echoes along a plurality of second directions each intersecting the first direction at a different one of the targets;
   a controller for controlling the steering of the second ultrasonic receiver to steer the first passive transducer in each of the second directions to receive each of the echoes at the passive transducer such that both the active and passive transducers each receive echoes resulting from the same pulse of ultrasonic energy transmitted in the first direction; and
   a signal processor for combining the echoes received by the first and second ultrasonic receivers to form a composite image for the one or more targets.

2. The ultrasonic imaging system of claim 1 wherein the passive transducer comprises a phased array transducer.

3. The ultrasonic imaging system of claim 1 wherein the active transducer comprises a phased array transducer steerable by the ultrasonic transmitter and the first ultrasonic receiver.

4. The ultrasound imaging system of claim 1 wherein:
   the ultrasonic transmitter and the first ultrasonic receiver are steerable; and
   the controller further controls the steering of the transmitter and the first receiver to steer the active transducer in a plurality of the first directions thereby defining an active scan area.

5. The ultrasound imaging system of claim 4 wherein the active transducer is rigidly fixed relative to the passive transducer.

6. The ultrasound imaging system of claim 4 wherein the controller controls the steering of the second ultrasonic receiver to steer the passive transducer in the plurality of second directions thereby defining a passive scan area which overlaps with the active scan area.

7. The ultrasound imaging system of claim 6 wherein:
   the active transducer comprises a phased array transducer and the active scan area approximates an active sector with the active transducer at its apex, and
   the passive transducer comprises a phased array transducer and the passive scan area approximates a passive sector with the passive transducer at its apex.

8. The ultrasound imaging system of claim 1 wherein the second direction intersects the first direction at at least one target with an angle of between 30° and 150°.

9. The ultrasound imaging system of claim 8 wherein the second direction intersects the first direction at at least one target with an angle of between 60° and 120°.

10. The ultrasound imaging system of claim 1 further comprising a second passive transducer coupled to a steerable third ultrasonic receiver for receiving the plurality of echoes along a plurality of third directions each intersecting the first direction at a different one of the targets;
    wherein the controller further controls the steering of the third ultrasonic receiver to steer the second passive transducer in each of the third directions to receive each of the echoes at the second passive transducer such that the active transducer, the first passive transducer, and the second passive transducer all each receive the echoes resulting from the pulse of ultrasonic energy produced in the first direction; and
    wherein the signal processor further combines the echoes received by the first, second, and third receivers to form a composite image for the one or more targets.

11. The ultrasound imaging system of claim 10 wherein:
    the first passive transducer is adapted to be disposed in a first plane with the active transducer and the one or more targets; and
    the second passive transducer is adapted to be disposed outside the first plane.

12. The ultrasound imaging system of claim 10 wherein the first and second passive transducer each comprise a phased array transducer.

13. The ultrasound imaging system of claim 10 wherein the active transducer comprises a phased array transducer steerable by the ultrasonic transmitter and the first ultrasonic receiver.

14. The ultrasound imaging system of claim 10 wherein:
    the ultrasonic transmitter and the first ultrasonic receiver are steerable; and
    the controller further controls the steering of the transmitter and the first receiver to steer the active transducer in a plurality of the first directions thereby defining an active scan area.

15. The ultrasound imaging system of claim 14 wherein the active transducer is rigidly fixed relative to the first and second passive transducers.

16. The ultrasound imaging system of claim 10 wherein each third direction intersects the first direction at at least one of the targets with an angle of between 30° and 150°.

17. The ultrasound imaging system of claim 10 wherein the one or more targets are structures in a human body and the ultrasound pulse has a carrier frequency between 2.0 and 10 MHz.

18. An ultrasound imaging system having improved spatial resolution, comprising:
    an active phased array transducer coupled to an ultrasonic transmitter for producing a pulse of ultrasonic energy in a first direction along which one or more targets are disposed, the active phased array transducer also is coupled to a first ultrasonic receiver for receiving a plurality of echoes of the pulse, each of the echoes corresponding to a different one of the targets and returning to the active phased array transducer along the first direction;
    a first passive phased array transducer coupled to a steerable second ultrasonic receiver for receiving the plurality of echoes along a plurality of second directions, each intersecting the first direction at a different one of the targets;

a controller for controlling the steering of the second ultrasonic receiver to steer the first passive phased array transducer in each of the second directions to receive each of the echoes at the passive phased array transducer such that both the active and passive phased array transducers each receive echoes resulting from the pulse of ultrasonic energy produced in the first direction; and a signal combiner for combining the echoes received by the first and second ultrasonic receivers to form a composite image for the one or more targets.

19. The ultrasound imaging system of claim 18 wherein the active transducer is rigidly fixed relative to the passive transducer.

20. The ultrasound imaging system of claim 18 wherein:

the ultrasonic transmitter and the first ultrasonic receiver are steerable;

the controller further controls the steering of the transmitter and the first receiver to steer the active phased array transducer in a plurality of the first directions thereby defining an active scan area;

the controller controls the steering of the second ultrasonic receiver to steer the passive phased array transducer in the plurality of second directions thereby defining a passive scan area which overlaps with the active scan area;

the active scan area approximates an active sector having the active phased array transducer at its apex, and the passive scan area approximates a passive sector having the passive phased array transducer at its apex.

21. The ultrasound imaging system of claim 18 wherein the second direction intersects the first direction at at least one target with an angle of between 30° and 150°.

22. The ultrasound imaging system of claim 21 wherein the second directions intersects the first direction at at least one target with an angle of between 60° and 120°.

23. The ultrasound imaging system of claim 18 wherein the one or more targets are structures in a human body and the ultrasound pulse has a carrier frequency between 2.0 and 10 MHz.

24. A method of forming an ultrasound image having improved spatial resolution, comprising:

emitting from an active transducer a pulse of ultrasonic energy in a first direction along which one or more targets are disposed;

receiving at the active transducer a plurality of echoes of the pulse, each of the echoes corresponding to a different one of the targets and returning to the active transducer along the first direction;

receiving at a passive transducer the plurality of echoes from a plurality of second directions, extending from the passive transducer and intersecting the first direction at a different one of the targets;

steering the passive transducer in each of the second directions in order to track echoes from the propagation of the pulse along the first direction and to receive each of the echoes at the passive transducer such that both the active and passive transducers receive echoes resulting from the pulse of ultrasonic energy produced in the first direction by the active transducer; and combining the echoes received by the active and passive transducers along the first and second directions, respectively, to form a composite image for the one or more targets.

25. The method of claim 24 further comprising rigidly fixing the active transducer relative to the passive transducer.

26. An imaging system for forming images having improved spatial resolution, comprising:

an active radiator coupled to a transmitter for producing a pulse of energy in a first direction along which one or more targets are disposed, the active radiator also is coupled to a first receiver for receiving a plurality of echoes of the energy pulse, corresponding to a plurality of the targets and returning to the active transducer along the first direction;

a first passive radiator coupled to a steerable second receiver for also receiving the plurality of echoes along a plurality of second directions intersecting the first direction at a different one of the targets;

a controller for controlling the steering of the second receiver to steer the passive radiator in each of the second directions in order to track the propagation the echoes of the energy pulse along the first direction and receive each of the echoes at the passive radiator such that both the active and passive radiators each receive echoes resulting from the energy pulse produced in the first direction; and a signal processor for combining the echoes received by the first and second receivers to form a composite echo signal for the one or more targets.

27. The imaging system of claim 26 further comprising a second passive radiator coupled to a steerable third receiver for also receiving the plurality of echoes along a plurality of third directions intersecting the first direction at a different one of the targets;

wherein the controller further controls the steering of the third receiver to steer the second radiator in each of the third directions in order to track the propagation of echoes of the pulse along the first direction and receive each of the echoes at the second passive radiator such that the active radiator, the first passive radiator, and the second passive radiator all receive echoes resulting from the pulse of ultrasonic energy produced in the first direction; and wherein the signal processor combines the echoes received by the first, second, and third receivers to form a composite echo signal for the one or more targets.

* * * * *